US008891123B2

(12) United States Patent
Yoda et al.

(10) Patent No.: US 8,891,123 B2
(45) Date of Patent: Nov. 18, 2014

(54) COMMUNICATION TERMINAL, STORAGE MEDIUM FOR STORING COMMUNICATION TERMINAL CONTROL PROGRAM, SERVER, AND SERVER CONTROL METHOD

(71) Applicant: Seiko Epson Corporation, Tokyo (JP)

(72) Inventors: Kiyoshi Yoda, Nagano (JP); Naoki Kojima, Nagano (JP); Takefumi Sayo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/897,844

(22) Filed: May 20, 2013

(65) Prior Publication Data

US 2013/0314744 A1 Nov. 28, 2013

(30) Foreign Application Priority Data

May 24, 2012 (JP) ................................ 2012-118314

(51) Int. Cl.
| | |
|---|---|
| G06F 3/12 | (2006.01) |
| G06F 15/00 | (2006.01) |
| G06K 1/00 | (2006.01) |
| G06K 15/00 | (2006.01) |
| H04N 1/00 | (2006.01) |
| H04N 1/40 | (2006.01) |

(52) U.S. Cl.
CPC ............ G06K 15/002 (2013.01); G06F 3/1208 (2013.01); G06F 3/122 (2013.01); G06F 3/1256 (2013.01); G06F 3/1288 (2013.01)
USPC ........... 358/1.15; 358/1.1; 358/1.9; 358/1.16; 358/527

(58) Field of Classification Search
None
See application file for complete search history.

(56) References Cited

U.S. PATENT DOCUMENTS

| | | | | |
|---|---|---|---|---|
| 7,440,134 B2* | 10/2008 | Natori | ............................ | 358/1.9 |
| 7,584,242 B2* | 9/2009 | Ebuchi | ........................ | 709/203 |
| 7,907,315 B2* | 3/2011 | Oyanagi et al. | ............... | 358/527 |
| 7,916,342 B2* | 3/2011 | Natori | ............................ | 358/1.3 |
| 8,233,166 B2* | 7/2012 | Ogasawara | .................. | 358/1.13 |
| 2009/0241024 A1* | 9/2009 | Shiohara | ....................... | 715/274 |
| 2010/0002246 A1* | 1/2010 | Ozaki et al. | .................... | 358/1.9 |
| 2011/0179354 A1* | 7/2011 | Park | ............................. | 715/274 |
| 2012/0092730 A1* | 4/2012 | Aoki | ............................ | 358/1.18 |
| 2013/0176597 A1* | 7/2013 | Aoki | ............................ | 358/1.18 |

FOREIGN PATENT DOCUMENTS

JP 2008-299739 A 12/2008

* cited by examiner

*Primary Examiner* — Satwant Singh
(74) *Attorney, Agent, or Firm* — Global IP Counselors, LLP

(57) ABSTRACT

The advantage of the invention is to improve the convenience when a preview image of processing target data is displayed in a communication terminal that does not have a preview generating function. A communication terminal has a processing target transmitting section that transmits processing target data to a server, a preview receiving section that receives preview image data of a page in which generation of preview image data is completed before generation of preview image data of all pages is completed with respect to preview image data of the processing target data generated by the server, and a preview displaying section that displays a preview image based on the received preview image data.

7 Claims, 3 Drawing Sheets

COMMUNICATION TERMINAL, STORAGE MEDIUM FOR STORING COMMUNICATION TERMINAL CONTROL PROGRAM, SERVER, AND SERVER CONTROL METHOD

CROSS-REFERENCE TO RELATED APPLICATIONS

This application claims priority to Japanese Patent Application No. 2012-118314 filed on May 24, 2012. The entire disclosure of Japanese Patent Application No. 2012-118314 is hereby incorporated herein by reference.

BACKGROUND

1. Technical Field

The present invention relates to a communication terminal, a communication terminal control program, a server, and a server control method, and particularly relates to a display of a preview image.

2. Background Technology

A system has been known, in which a preview image of data as a print target can be confirmed in a communication terminal that has no preview generating program installed (for example, Patent Document 1).

Japanese Laid-open Patent Publication No. 2008-299739 (Patent Document 1) is an example of the related art.

SUMMARY

Problems to be Solved by the Invention

However, a user cannot confirm a preview image in a communication terminal until a file of a print target is transmitted from the communication terminal to a device that has a function of generating preview image data instead of the communication terminal and thereafter generation of preview image data of all pages in the file is completed. Incidentally, Patent Document 1 does not mention preview of a file having a plurality of pages. The invention has been made to address the above-described circumstances, and the advantage of the invention is to improve the convenience when a preview image of processing target data is displayed in a communication terminal that does not have a preview generating function.

Means Used to Solve the Above-Mentioned Problems

In order to achieve the above-described object, a communication terminal has a processing target transmitting section, a preview receiving section, and a preview displaying section. The processing target transmitting section transmits processing target data to a server. The preview receiving section receives preview image data of a page in which generation of preview image data is completed before generation of preview image data of all pages is completed with respect to preview image data of processing target data generated by the server. The preview displaying section displays a preview image based on the received preview image data.

Specifically, the communication terminal of the invention can receive preview image data with respect to a page in which generation of preview image data is completed even if generation of preview image data of all pages is not completed. Therefore, compared to a well-known configuration in which preview image data is acquired after generation of preview image data of all pages is completed, the communication terminal can start receiving preview image data earlier and start a display on the communication terminal earlier. As a result, a user of the communication terminal can start confirming a preview image earlier than the well-known configuration.

The function of each means described in the claims is achieved by hardware resources whose function is specified by the configuration itself, hardware resources whose function is specified by the program, or a combination thereof. Also, the function of each means is not limited to one that is achieved by hardware resources physically independent of each other. Further, the invention can be implemented as a method that controls a communication terminal or a server, a program that controls a communication terminal or a server, or a recording medium that records the program. The recording medium for the computer program can be a magnetic recording medium, a magneto-optical recording medium, or any recording medium that will be developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, embodiments of the invention will be explained with reference to the attached drawings. Corresponding elements in the respective drawings have the same reference number, and overlapping explanations will be omitted.

1. First Embodiment

1-1. Configuration

Figure 1:
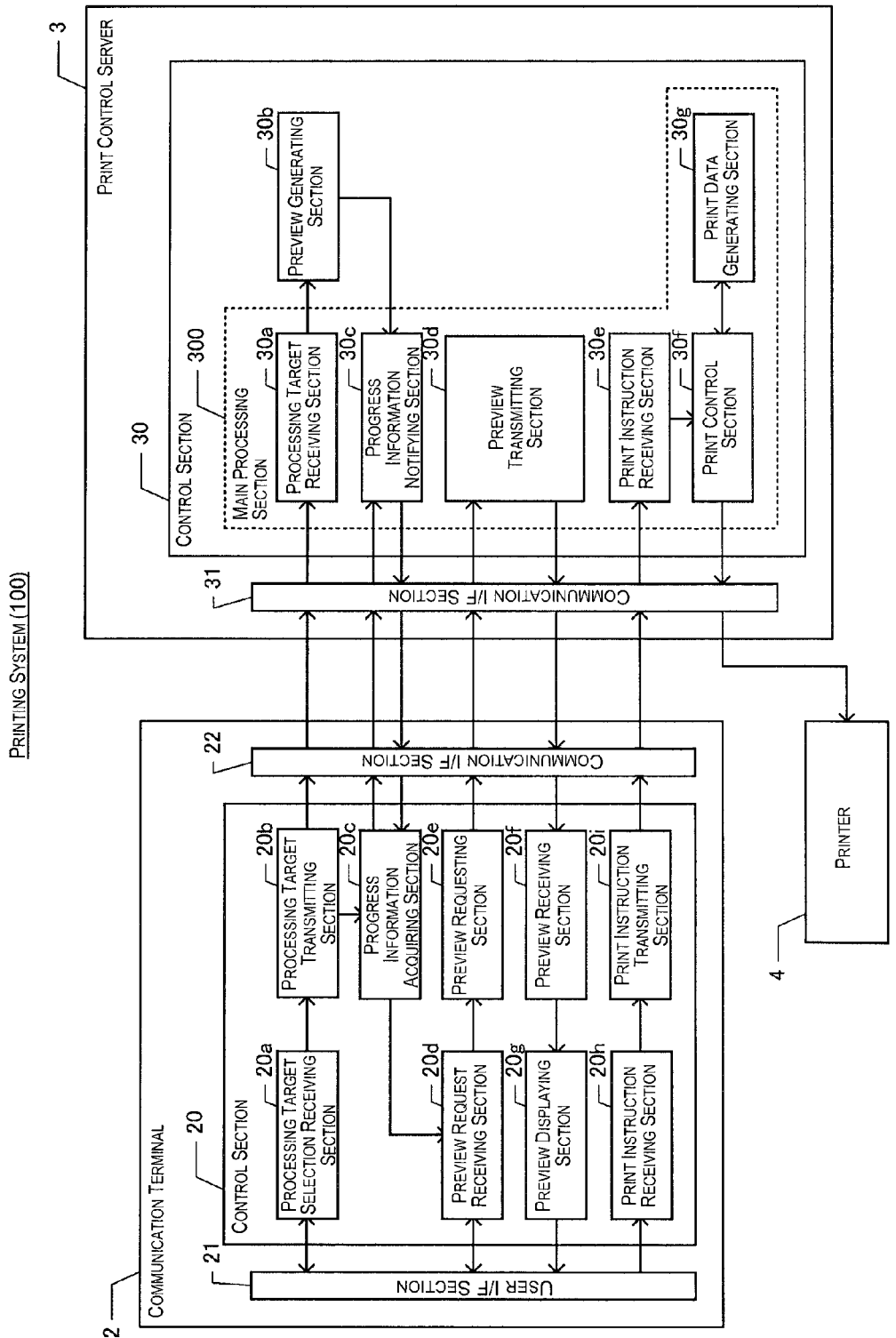
FIG. 1 is a block diagram of a printing system according to an embodiment of the invention.

FIG. 1 is a block diagram that shows a configuration of a printing system 100 according to a first embodiment of the invention. The printing system 100 includes a communication terminal 2, a print control server 3 (hereinafter, just referred to as the server 3), and a printer 4. The communication terminal 2 and the server 3, and the server 3 and the printer 4 can communicate with each other through the Internet or the like. In the printing system 100, when the communication terminal 2 transmits processing target data to the server 3, the server 3 generates preview image data that shows a print preview image of the processing target data. Then, the communication terminal 2 receives the preview image data generated by the server, and displays a preview image. The processing target data can be any kind of file. The present embodiment assumes a document file, a drawing file, or the like, that has a plurality of pages in a file. In the printing system 100, before generation of preview image data of all pages included in the processing target data is completed, the communication terminal 2 can receive preview image data of a page in which generation of preview image data has already been completed. Also, in the printing system 100, when the server 3 receives instructions from the communication terminal 2 to print processing target data transmitted from the communication terminal 2, the server 3 generates print data based on the processing target data. Then, the server 3 transmits the print data to the printer 4, and causes the printer 4 to conduct printing based on the print data.

The communication terminal 2 is an information processing device such as a smartphone or a tablet PC. The communication terminal 2 has a control section 20, a user I/F section 21, a communication I/F section 22, and the like, to achieve the above-described functions of the printing system 100. The control section 20 has a CPU, a non-volatile memory, a volatile memory, and the like, which are not shown in the drawing. Various kinds of programs recorded in the memory can be executed by the CPU. The user I/F section 21 constructs a touch panel or keys, and can display an image designated by the control section 20 or input an operation by a user so as to notify the control section 20 of information that shows the operation. The user I/F section 21 can be provided with a speaker or a microphone. The communication I/F section 22 is constructed by a circuit that allows the control section 20 to communicate with another device through a network.

The program that can be executed by the control section 20 of the communication terminal 2 includes a processing target selection receiving section 20*a*, a processing target transmitting section 20*b*, a progress information acquiring section 20*c*, a preview request receiving section 20*d*, a preview requesting section 20*e*, a preview receiving section 20*f*, a preview displaying section 20*g*, a print instruction receiving section 20*h*, and a print instruction transmitting section 20*i*. The processing target selection receiving section 20*a* is a program that causes the communication terminal 2 to receive selection of processing target data by a user. The processing target transmitting section 20*b* is a program for transmitting processing target data selected by a user to the server 3. The progress information acquiring section 20*c* is a program that acquires progress information showing the progress situation of generation of preview image data of processing target data from the server 3.

The preview request receiving section 20*d* is a program that causes the control section 20 to direct the progress situation based on the progress information to a user and receive selection of at least one page by a user among pages in which the progress information shows that generation of preview image data has been completed. The preview requesting section 20*e* is a program that requests preview image data of a page selected by a user to the server 3. The preview receiving section 20*f* is a program that receives preview image data of the processing target data, generated by the server 3, from the server 3. The preview displaying section 20*g* is a program that causes a touch panel of the user I/F section 21 to display a preview image corresponding to the processing target data based on the preview image data received from the server 3. The print instruction receiving section 20*h* is a program that receives print instructions of a user with respect to the processing target data. The print instruction transmitting section 20*i* is a program that instructs the server 3 to conduct printing based on the processing target data in response to the print instructions of a user.

The server 3 has a control section 30, a communication I/F section 31, an HDD (Hard Disk Drive) which is not shown in the drawing, an external I/F section (interface with peripheral devices) which is not shown in the drawing, and the like. The control section 30 has a RAM, a ROM, and a CPU, which are not shown in the drawing. Various kinds of programs stored in the HDD or the ROM can be loaded on the RAM and executed by the CPU. The communication I/F section 31 is constructed by a circuit or the like that allows the control section 30 to communicate with another device through a network. Here, FIG. 1 shows that the server 3 is constructed by a single computer. However, the server 3 can be constructed by a plurality of computers. Specifically, it can be configured such that each computer of the server 3 takes charge of each program described below and executes it, and data is transmitted and received between the computers through a LAN or the like.

The program that can be executed by the control section 30 of the server 3 includes a processing target receiving section 30*a*, a preview generating section 30*b*, a progress information notifying section 30*c*, a preview transmitting section 30*d*, a print instruction receiving section 30*e*, a print control section 30*f*, and a print data generating section 30*g*. The processing target receiving section 30*a* is a program that causes the server 3 to receive processing target data from the communication terminal 2. The preview generating section 30*b* is a program that generates preview image data based on the processing target data received from the communication terminal 2. As the preview image data, a JPEG file can be used, for example. Alternatively, the preview image data can be image data in various format such as PNG format or PDF format, and it can be configured such that a user can select desired format among them in advance. Also, it can be configured such that a user can select resolution of the preview image data. With such a configuration in which these can be selected, a user can adjust the amount of communication data required for reception of the preview image data. The progress information notifying section 30*c* is a program that notifies the communication terminal 2 of progress information showing the progress situation of generation of preview image data in the preview generating section 30*b*.

The preview transmitting section 30*d* is a program that causes the control section 30 to transmit the generated preview image data to the communication terminal 2. The print instruction receiving section 30*e* is a program that receives print instructions transmitted from the communication terminal 2. The print control section 30*f* is a program that transmits print data generated by the print data generating section 30*g* to the printer 4, and causes the printer 4 to conduct printing. The print data generating section 30*g* is a program that generates print data for causing the printer 4 to conduct printing based on the processing target data. Here, the processing target receiving section 30*a*, the progress information notifying section 30*c*, the preview transmitting section 30*d*, the print instruction receiving section 30*e*, the print control section 30*f*, and the print data generating section 30*g* are collectively referred to as a main processing section 300.

The printer 4 conducts printing based on the print data received from the server 3. The printer 4 has a control section (not shown in the drawing) provided with a CPU, a RAM, a ROM and the like, a print section (not shown in the drawing), a communication section (not shown in the drawing), and the like. The ROM stores various programs such as a communication program or a print program that are read in the RAM and executed by the CPU. The printer 4 controls the print section or the communication section by causing the CPU to execute these programs so as to achieve the above-described functions.

1-2. Preview Image Display

Next, a flow of a preview image display will be explained with reference to the sequence chart shown in FIG. 2 and the screen transition diagram shown in FIG. 3. First, when a user operates the communication terminal 2 and selects a file as processing target data (step S1), the control section 20 of the communication terminal 2 receives the file as the processing target data by the processing target selection receiving section 20a. A screen G1 of FIG. 3 shows an example of the screen that shows a list of the files stored in the memory of the communication terminal 2 by starting an application program for using the printing system 100. When a user selects a figure g11 that shows the file to be printed from the list by a touch operation, the file is received as the processing target data.

Then, the control section 20 transmits the processing target data to the server 3 by the processing target transmitting section 20b (step S2). During the transmission, the control section 20 displays that a file is being transmitted on the touch panel as shown in a screen G2. When the control section 30 of the server 3 receives the processing target data transmitted from the communication terminal 2 by the processing target receiving section 30a, the control section 30 of the server 3 stores the processing target data in a predetermined storage place such as an HDD of the server 3, and transmits a reception completion notification to the communication terminal 2 (step S3). When the control section 20 of the communication terminal 2 receives the reception completion notification from the server 3, the control section 20 of the communication terminal 2 transmits instructions of generating preview image data for a print preview of the processing target data to the server 3 (step S4). The instructions of generating preview image data include print setting information and preview setting information. The print setting information includes information on a paper size, a paper kind, color/monochrome, print resolution, and the like, for example. The preview setting information includes information that designates resolution of the preview image data, format of the preview image data, and the like, for example. A user can change these settings on a setting screen that is displayed when a touch operation is conducted to a setting button g12 on the screen G1, for example. When the control section 30 of the server 3 receives the instructions of generating preview image data from the communication terminal 2, the control section 30 of the server 3 instructs the preview generating section 30b to generate preview image data (step S5), and transmits a generation instruction completion notification to the communication terminal 2 (step S6). When the control section 20 of the communication terminal 2 receives the generation instruction completion notification of step S6, the control section 20 of the communication terminal 2 displays a frame g31 of a page as shown in a screen G3, for example, until receiving preview image data of a first page.

In response to the instructions of generating preview of step S5, the control section 30 of the server 3 causes the preview generating section 30b to start generating preview image data of the processing target data sequentially from a first page of the processing target data. The preview image data is generated based on the print setting information or the preview setting information, and the processing target data. Every time generation of preview image data of one page is completed by the preview generating section 30b, the control section 20 stores the generated preview image data in a predetermined storage place such as the HDD of the server 3, and notifies the progress information notifying section 30c of the progress situation (step S7). In response to the notification of step S7, the control section 30 causes the progress information notifying section 30c to renew the progress information showing the progress situation of generation of the preview image data of the processing target data. More specifically, the control section 30 increments a variable that retains the number of pages in which generation of the preview image data of the processing target data, received in step S2, has been completed.

The control section 30 notifies of the progress situation, stores the generated preview image data in a predetermined storage place, and renews the progress information by the progress information notifying section 30c for each page in the same manner as in step S7 until the preview generating section 30b completes generation of the preview image data of all the pages of the file transmitted from the communication terminal 2. When generation of the preview image data of the final page of the processing target data is completed, the control section 30 causes the preview generating section 30b to store the preview image data of the final page in a predetermined storage place and notify the main processing section 300 (progress information notifying section 30c) that generation of the preview image data of all the pages has been completed (step S8).

When the control section 20 of the communication terminal 2 receives the generation instruction completion notification of step S6, the control section 20 of the communication terminal 2 requests the progress information to the server 3 by the progress information acquiring section 20c with every predetermined period of time (step S9), and receives the progress information from the server 3 (step S10). Specifically, the communication terminal 2 acquires the progress information by polling. In the present embodiment, when the control section 20 of the communication terminal 2 acquires the progress information that shows generation of the preview image data of the first page has been completed, the control section 20 of the communication terminal 2 requests the preview image data of the first page to the server 3, acquires the preview image data of the first page from the server 3, and displays the preview image data of the first page on the touch panel based on the preview image data. As described above, in the present embodiment, the control section 20 automatically requests the preview image data to the server 3 exceptionally with respect to the first page regardless of whether or not there is a display request from a user, and displays on the touch panel. As described below, with respect to the second page and the subsequent pages, the request to the server 3 is conducted in response to an operation of a user to request a preview. A screen G4 shows a screen that displays a preview image g42 of the first page. It is shown that a preview information displaying section g41, the preview image g42, a print button g43, and a setting button g44 are displayed on the screen G4. The preview information displaying section is shown in format of "x/y". "x" represents the page number of the preview image on the display. "y" represents the page number in which generation of the preview image data has been completed. Specifically, "y" represents the progress information. For example, "1/1" of the preview information displaying section g41 on the screen G4 shows that generation of the preview image data of the first page has been completed, and the preview image on the display is a preview image of the first page.

The control section 20 of the communication terminal 2 can acquire the progress information by repeating steps S9-S10 with every predetermined period of time. The control section 20 renews the above-described "y" portion of the preview information displaying section g41 on the screen G4 using the acquired progress information. For example, when the control section 20 acquires the progress information showing that generation has been completed up to the third page, "1/3" is displayed. A screen G5 shows that the "y" portion of the preview information displaying section g41 has been renewed from the screen G4.

Subsequently, when a user conducts an operation to display a preview image of a page which the user wants to confirm on the touch panel by operating the communication terminal 2 (step S11), the control section 20 of the communication terminal 2 receives a preview request of the user by the preview request receiving section 20*d*. For example, a user can request for a display of preview image data of the second page by a flick operation in a predetermined direction with the finger on the touch panel.

The control section 20 then requests the preview image data of that page to the server 3 by the preview requesting section 20*e* (step S12). The control section 30 of the server 3 transmits the preview image data of the page requested by the user to the communication terminal 2 by the preview transmitting section 30*d* (step S13). When the control section 20 receives the preview image data of that page by the preview receiving section 20*f*, the control section 20 causes the preview displaying section 20*g* to display a preview image of the page requested by the user on the touch panel based on the preview image data. A screen G6 shows a state in which the preview image of the second page is displayed.

The control section 20 displays a setting button g62 together with the preview image on the touch panel. When a user confirms the preview image, and as a result, operates the setting button g62 by a touch operation to change the print settings, the control section 20 displays a print setting screen on the touch panel, and can receive change in the print settings by the user. For example, when a user conducts an operation to change the settings to monochrome printing in a case where color printing has been selected, the control section 20 transmits a request for generation of preview image data to the server 3 again, and the server 3 generates preview image data in monochrome again. Here, even if the print settings are changed, processing target data is already stored in the server 3. Therefore, the control section 20 of the communication terminal 2 does not need to transmit processing target data to the server 3 again.

When a user conducts a print instruction operation to the communication terminal 2 (step S14), the control section 20 receives the print instructions of the user by the print instruction receiving section 20*h*, and transmits the print instructions to the server 3 by the print instruction transmitting section 20*i* (step S15). A user can input print instructions to the communication terminal 2 by a touch operation to a print button g32, g43, g53, or g63, for example. When the control section 30 of the server 3 receives the print instructions by the print instruction receiving section 30*e*, the control section 30 of the server 3 generates print data by the print data generating section 30*g* (step S16). More specifically, the control section 30 generates print data based on the print setting information and the processing target data. Then, the control section 30 sequentially transmits the print data, generated by the print data generating section 30*g*, to the printer 4 by the print control section 30*f* (step S17). When the printer 4 receives the print data, the printer 4 conducts printing based on the print data, and transmits the print results to the server 3 (step S18). When the control section 30 of the server 3 receives the print results from the printer 4, the control section 30 of the server 3 transmits the print results to the communication terminal 2 by the print control section 30*f* (step S19). When the control section 20 receives the print results, the control section 20 displays the print results on the touch panel.

As described above, in this printing system, the communication terminal 2 can receive preview image data with respect to a page in which generation has been completed even if generation of preview image data of all pages is not completed. Therefore, compared to a well-known configuration in which preview image data is acquired after generation of preview image data of all pages is completed, the communication terminal 2 can start receiving preview image data earlier and start a display on the communication terminal 2 earlier. As a result, a user of the communication terminal 2 can start confirming a preview image earlier than the well-known configuration. Further, the invention is configured to transmit preview image data of a page selected by a user without transmitting preview image data of all pages to the communication terminal 2. Therefore, compared to a configuration in which preview image data of all pages is transmitted, the data amount transmitted from the server 3 to the communication terminal 2 can be reduced.

Figure 2:
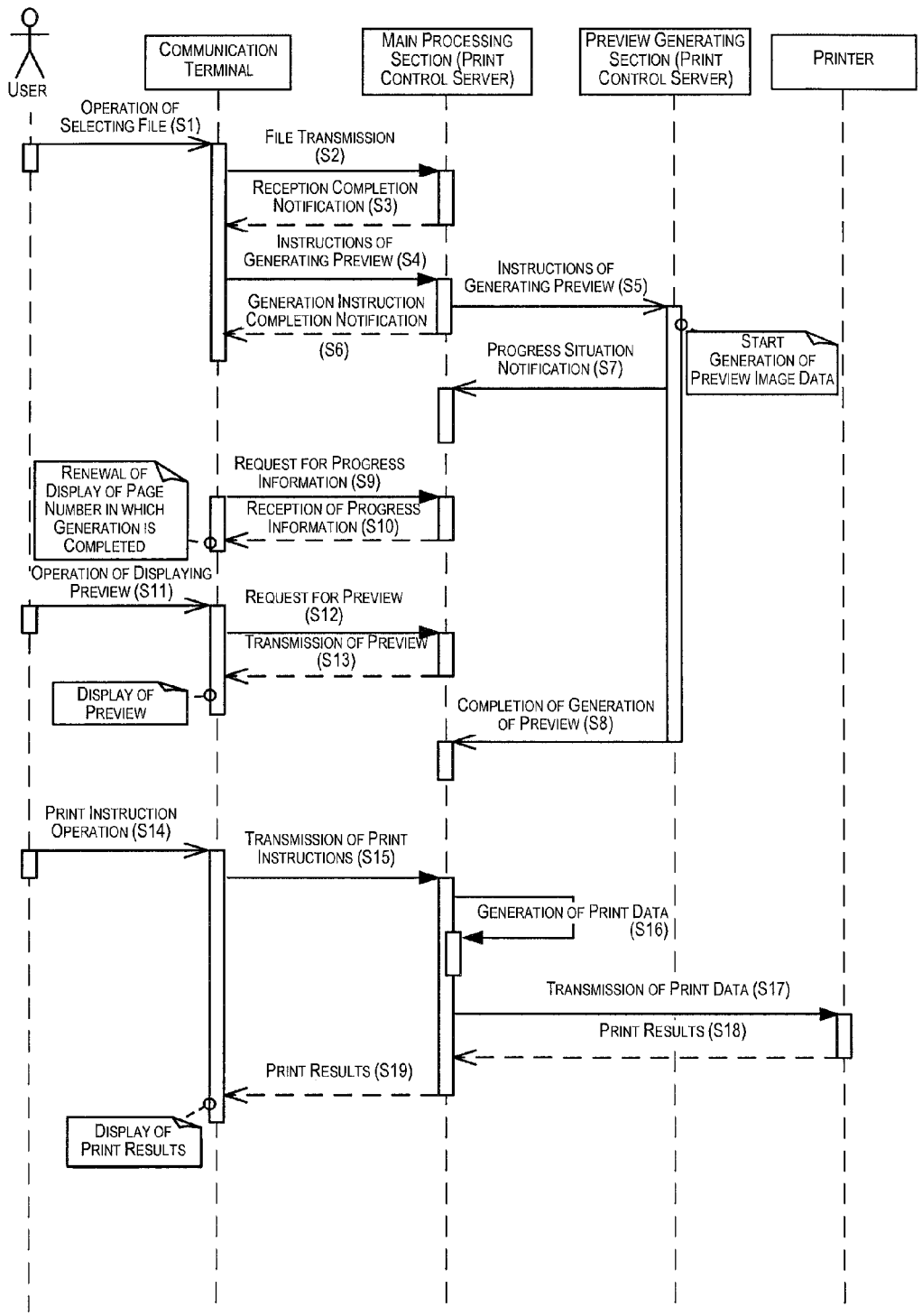
FIG. 2 is a sequence chart according to an embodiment of the invention.
Figure 3:
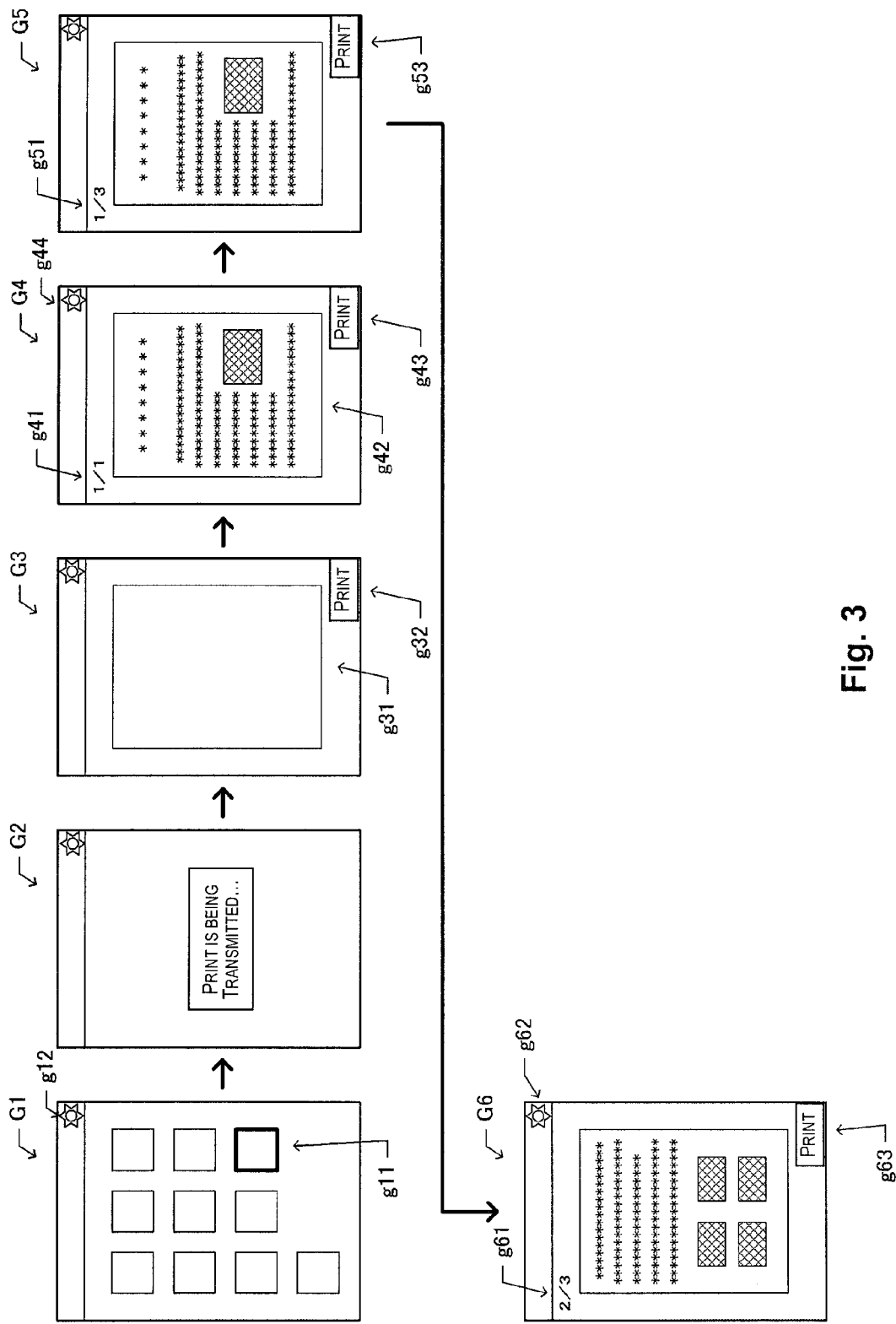
FIG. 3 is a diagram showing screen transition according to an embodiment of the invention.

In the sequence chart of FIG. 2, a user conducts print instructions after generation of preview image data of all pages of processing target data is completed. In the present embodiment, however, since the print data is generated separately from the preview image data, a user can conduct print instructions regardless of the progress situation of generation of preview image data. In the example of FIG. 3, the print button is displayed on each screen of the screens G3-G6, and a user can conduct print instructions regardless of the progress situation of preview image data. When a user conducts print instructions in a state where generation of preview image data of all pages is not completed (including a case where generation is not completed in any page, or a case where generation is completed in several pages but is not completed in all pages), the print data is generated separately from the preview image data in the server 3 and transmitted to the printer 4, and printing is conducted. As a result, printing can be started earlier than a case in which printing cannot be conducted until generation of preview image data of all pages is completed.

2. Another Embodiment

The technical scope of the invention is not limited to the above-described embodiment. Various modifications can be possible without substantially departing from the subject matter of the invention. For example, in the above-described embodiment, the print instruction receiving section 20*h* can change the type of the print settings, which a user can set with respect to printing based on processing target data, in accordance with the progress situation of generation of preview image data by the server 3. More specifically, for example, it can be configured to receive designation of the print range (designation of the range of pages to be printed) in a case where generation of preview image data of all pages is completed, and not to receive designation of the print range in a case where generation of preview image data of all pages is not completed. In other words, it can be configured to receive only print instructions to all pages in a case where generation is not completed. As described above, in a case where the printing system 100 cannot acquire the total page number of processing target data until generation of preview image data of all pages is completed in the server 3, reception or non-reception of designation of the print range is changed based on whether generation of preview image data of all pages is completed or not. Consequently, it is possible to prevent a user from instructing to print by designating the print range in a state where generation of preview image data of all pages is not completed.

In a case where the printing system 100 can acquire the total page number of processing target data even if generation of preview image data of all pages of processing target data is not completed, it can be configured to receive designation of the print range regardless of the progress situation of generation of preview image data.

According to the example described in the above-described embodiment, a page for a display of preview image data is selected sequentially one by one with a flick operation in the range of a page in which generation of preview image data has already been completed. However, in the case of the configuration in which the total page number of processing target data can be acquired even if generation of preview image data of all pages is not completed, it can be configured such that a preview image of a page can be acquired by designating the number of that page. In such a case, the server 3 generates preview image data sequentially from a first page when receiving instructions of generating preview image data from the communication terminal 2. However, in a case where the communication terminal 2 requests preview image data of a page in which generation is not completed, the server 3 can generate preview image data of the requested page first. Alternatively, a process of generating preview image data sequentially from a first page and a process of generating preview image data of the requested page can be conducted concurrently.

Also, in a case where a user of the communication terminal 2 continuously conducts a flick operation in order to confirm a preview image, it can be configured such that the page number showing the number of the displayed page is incremented by the number of the flick operation, but a request for preview image data of that page is not transmitted from the communication terminal 2 to the server 3. Then, in a case where a predetermined period of time (about a few seconds) passes since the continuous flick operation is stopped, preview image data of the page corresponding to the page number incremented in response to the continuous flick operation can be requested to the server 3. By doing so, the amount of communication data can be reduced compared to a case where preview image data of the pages corresponding to the continuous flick operation is requested and the preview image data of the pages is received from the server 3. Further, preview image data of the page a user wants to confirm can be displayed early.

According to the configuration of the above-described embodiment, the print instructions are transmitted from the communication terminal 2 to the server 3, and the server 3 transmits print data to the printer 4 so as to cause the printer 4 to conduct printing. However, for example, another configuration can be possible in which the print instructions are directly transmitted from the communication terminal 2 to the printer 4 without being transmitted to the server 3. More specifically, the flow until preview image data is received from the server 3 in step S13 of FIG. 2 is the same as the above-described embodiment, and thereafter, the print instructions can be directly transmitted from the communication terminal 2 to the printer 4 by transmitting the preview image data from the communication terminal 2 to the printer 4 and transmitting the print instructions from the communication terminal 2 to the printer 4. Then, the printer 4 can conduct printing based on the preview image data transmitted from the communication terminal 2. In such a case, a configuration in which the communication terminal 2 and the printer 4 can communicate with each other through a wireless LAN or the like can be used.

According to the example described in the above-described embodiment, the invention is applied to the printing system. However, the invention can be implemented as a viewer system or a file conversion system. More specifically, for example, a file (processing target data) in format which cannot be opened by the communication terminal is transmitted to the server. The server converts the file into an image file in format which can be opened by the communication terminal, and transmits the image file back to the communication terminal. A user of the communication terminal can print the image file transmitted from the server by the printer, can store it in a predetermined storage region of the communication terminal so as to see it on the panel of the communication terminal, or can transmit it to another device.

What is claimed is:

1. A communication terminal comprising:
   a processing target transmitting section that transmits processing target data to a server, the processing target data including data for a plurality of pages;
   a progress information acquiring section that acquires, from the server, progress information while preview image data of all of the pages with respect to the processing target data is being generated, the progress information showing a page number of pages for which generation of the preview image data has been completed;
   a preview request receiving section that directs the page number to a user and receives selection of at least one page from the page number by the user;
   a preview receiving section that receives the preview image data corresponding to the page selected by the user before generation of the preview image data of all of the pages with respect to the processing target data by the server is completed; and
   a preview displaying section that displays a preview image based on the received preview image data.

2. The communication terminal according to claim 1 further comprising
   a preview requesting section that requests the preview image data corresponding to the page selected by the user to the server,
   wherein the preview receiving section receives the requested preview image data.

3. The communication terminal according to claim 1 further comprising:
   a print instruction receiving section that receives print instructions of a user with respect to the processing target data; and
   a print instruction transmitting section that instructs the server to conduct printing based on the processing target data in response to the print instructions of the user.

4. The communication terminal according to claim 3, wherein
   the print instruction receiving section changes a type of print settings which the user can set with respect to printing based on the progress information.

5. A non-transitory computer-readable storage medium for storing a communication terminal control program that achieves functions by a computer, the functions including:
   a processing target transmitting function that transmits processing target data to a server, the processing target data including data for a plurality of pages;
   a progress information acquiring function that acquires, from the server, progress information while preview image data of all of the pages with respect to the processing target data is being generated, the progress information showing a page number of pages for which generation of the preview image data has been completed;
   a preview request receiving function that directs the page number to a user and receives selection of at least one page from the page number by the user; and
   a preview receiving function that receives the preview image data corresponding to the page selected by the user before generation of the preview image data of all of the pages with respect to the processing target data by the server is completed; and
   a preview displaying function that displays a preview image based on the received preview image data.

6. A server comprising:
a processing target receiving section that receives processing target data from a communication terminal, the processing target data including data for a plurality of pages;
a preview generating section that generates preview image data of all of the pages with respect to the processing target data;
a progress information notifying section that notifies the communication terminal of progress information while the preview generating section is generating the preview image data of all of the pages, the progress information showing a page number of pages for which generation of the preview image data has been completed in the preview generating section; and
a preview transmitting section that transmits the preview image data corresponding to at least one page selected based on the page number, before generation of the preview image data of all pages of the processing target data is completed.

7. The server according to claim 6,
wherein
the preview transmitting section transmits preview image data of a page requested by the communication terminal, among pages in which the communication terminal is notified of completion of generation of preview image data, to the communication terminal.

* * * * *